United States Patent [19]
Holmes et al.

[11] Patent Number: 6,068,237
[45] Date of Patent: May 30, 2000

[54] PROPORTIONAL VARIABLE BLEED SOLENOID VALVE WITH SINGLE ADJUSTMENT PRESSURE CALIBRATION

[75] Inventors: Garrett R. Holmes, Ortonville; Michael D. McKenna, Warren, both of Mich.

[73] Assignee: Borg-Warner Automotive, Inc., Troy, Mich.

[21] Appl. No.: 09/094,303

[22] Filed: Jun. 9, 1998

Related U.S. Application Data

[60] Provisional application No. 60/064,446, Oct. 31, 1997.

[51] Int. Cl.[7] .............................. F16K 31/02; F16K 1/00; F16K 31/00
[52] U.S. Cl. ...................... 251/129.18; 251/331; 251/362
[58] Field of Search .................. 251/129.17, 129.18, 251/331, 360, 362

[56] References Cited

U.S. PATENT DOCUMENTS

| | | |
|---|---|---|
| 4,411,289 | 10/1983 | Walters . |
| 4,532,951 | 8/1985 | Fermanich . |
| 4,662,605 | 5/1987 | Garcia . |
| 5,051,631 | 9/1991 | Anderson . |
| 5,069,420 | 12/1991 | Stobbs et al. . |
| 5,127,624 | 7/1992 | Domke ............................... 251/129.15 |
| 5,218,999 | 6/1993 | Tanimoto . |
| 5,289,841 | 3/1994 | Maranzano . |
| 5,301,921 | 4/1994 | Kumar . |
| 5,307,774 | 5/1994 | Hammer .................................. 123/339 |
| 5,617,890 | 4/1997 | Brehm et al. . |
| 5,707,039 | 1/1998 | Hamilton et al. .................. 251/129.17 |

FOREIGN PATENT DOCUMENTS

| | | |
|---|---|---|
| 2041593 | 5/1991 | Canada . |

*Primary Examiner*—Kevin Shaver
*Assistant Examiner*—David A Bonderer
*Attorney, Agent, or Firm*—Harness, Dickey & Pierce; Greg Dziegielewski

[57] ABSTRACT

A proportional variable bleed solenoid valve that includes magnetic force adjustments to provide magnetic calibration. The control valve includes a housing defining a chamber, where an electromagnetic coil is wound on a bobbin and is coaxially mounted within the housing. A movable armature is coaxially positioned within the bobbin in the chamber and has an armature poppet valve extending form a bottom end of the armature. An armature spring is in contact with an upper end of the armature and a top wall of the bobbin, where the spring positions the armature in an initial position when the coil is not energized and where the armature moves to a second position in conjunction with the bias of the armature spring when the coil is energized. A pole piece is mounted to the housing and is positioned adjacent to the lower end of the armature to define an air gap between the pole piece and the armature. The pole piece includes an extended annular ring positioned below the lower end of the armature such that the armature poppet valve extends through the ring. A mounting bracket is secured to the housing adjacent to the pole piece and a valve sleeve is connected to the mounting bracket. The valve sleeve includes a central bore axially aligned with the armature such that a bottom seal surface of the armature poppet valve seats against a valve seat surface of the valve when the coil is energized to seal off an exhaust port so that a supply pressure orifice connected to the valve sleeve provides a control pressure at a control pressure opening in the valve sleeve. In order to provide magnetic force adjustments for magnetic calibrations, the valve sleeve is selectively positionable relative to the bracket so that the distance between the armature poppet valve and the seat surface is adjustable. In one particular embodiment, the valve sleeve is secured to the bracket by a threaded connection so that its position can be readily changed.

20 Claims, 2 Drawing Sheets

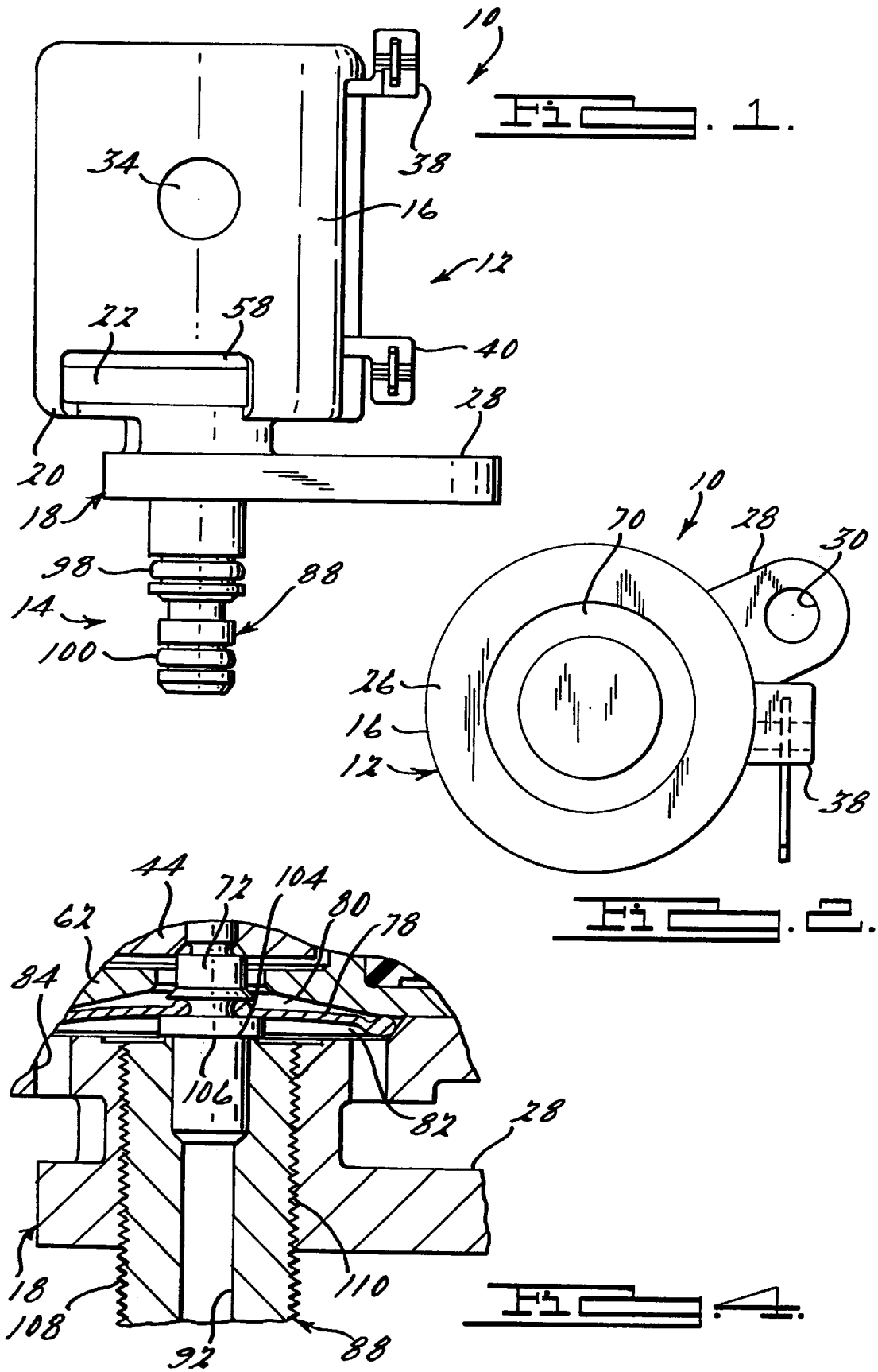

PROPORTIONAL VARIABLE BLEED SOLENOID VALVE WITH SINGLE ADJUSTMENT PRESSURE CALIBRATION

This application claims benefit of provisional application Ser. No. 60/064,446 Oct. 31, 1997.

BACKGROUND OF THE INVENTION

1. Field of the Invention

This invention relates generally to a fluid control valve and, more particularly, to a proportional variable bleed solenoid valve that includes a working air gap adjustment feature to provide magnetic calibration.

2. Discussion of the Related Art

Most vehicles generally incorporate a large number of electronically controlled systems, such as an automatic transmission controller. Automatic transmission controllers typically include several solenoid operated fluid control valves that independently act to control fluid pressure in the vehicle's transmission to operate various components of the transmission. For example, solenoid operated fluid control valves are known that use transmission fluid pressure to engage and disengage the transmission clutch. One particular known solenoid valve used for this purpose is referred to as a proportional bleed solenoid valve. The proportional bleed solenoid valve provides a particular control pressure that is directly proportional to the current applied to the solenoid coil in the valve. In other words, the output control pressure is nearly linear to the current applied to the solenoid coil. These types of solenoid valves are referred to as bleed valves because they use a relatively low flow of fluid through the hydraulic portion of the valve. Solenoid operated fluid control valves are also used in other vehicle controllers besides transmission controllers.

As the controllers become more sophisticated, it is necessary that the solenoid operated fluid control valves also include advancements and improvements over the state of the art. In this regard, it becomes important to increase the operating efficiency, reduce the cost, reduce the weight, reduce the complexity, etc. of the existing solenoid operated fluid control valves. Therefore, advancements in size, part reduction, component simplification, etc. of the control valves is advantageous.

One area of improvement for proportional valves is providing a consistent control pressure. Because the component tolerances in the control valves may vary from valve to valve, the control pressure may also vary from valve to valve at the same coil current. This may be important for modern automatic transmission controllers that need to provide a consistent control pressure for a particular operation. Therefore, it is important to provide some kind of calibration of the valve at the manufacturing level of the valve so that the valve control is consistent. One area where the control pressure of a proportional solenoid valve can be calibrated is the magnetic force adjustment, where an armature position driven by the coil of the solenoid can be calibrated.

U.S. Pat. No. 5,218,999 issued Jun. 15, 1993 to Tanimoto discloses a solenoid valve that provides a mechanical adjustment of the air gap between an armature and a pole piece so the gap is consistent from valve to valve to provide a constant performance. To provide the mechanical adjustment, an elastic wave washer is interposed between the pole piece and the casing of the valve. When a lid member is fixedly attached to the casing, the wave washer is compressed to a degree depending on the dimensions of the pole piece, the coil bobbin, and a magnetic holder to set the air gap at a constant dimension.

Although the solenoid valve described in the '999 patent offers one technique for adjusting the air gap between the armature and the pole piece to provide magnetic calibration, this technique is also susceptible to the tolerances of the elastic washer, as well as including other disadvantages. Therefore, there is still room for improvement in solenoid valves to provide a magnetic force adjustment for magnetic calibration.

SUMMARY OF THE INVENTION

In accordance with the teachings of the present invention, a proportional variable bleed solenoid valve is disclosed that includes a mechanism for magnetic force adjustments to provide magnetic calibration. The control valve includes a housing or can defining a chamber, where an electromagnetic coil is wound on a bobbin and is coaxially mounted within the housing. A movable armature is coaxially positioned within the bobbin in the chamber and has an armature poppet valve extending from a bottom end of the armature. An armature spring is in contact with an upper end of the armature and a top wall of the bobbin, where the spring positions the armature in an initial position when the coil is not energized. A pole piece is mounted to the housing and is positioned adjacent to the lower end of the armature to define an air gap between the pole piece and the armature. The pole piece includes a flux shunt portion that is an extended annular ring positioned below the lower end of the armature such that the armature poppet valve extends through the flux shunt ring. A mounting bracket is secured to the housing adjacent to the pole piece and a valve sleeve is connected to the mounting bracket. The valve sleeve includes a central bore axially aligned with the armature such that a bottom seal surface of the armature poppet valve seats against a valve seat surface of the valve. When the coil is energized, the poppet valve seals off an exhaust port so that a supply pressure orifice in fluid communication with the bore of the valve sleeve provides a control pressure at a control pressure opening in the valve sleeve.

In order to provide magnetic force adjustments for magnetic calibration, the valve sleeve is selectively positionable relative to the bracket so that the distance between the armature poppet valve and the seat surface is adjustable. In one particular embodiment, the valve sleeve is secured to the bracket by a threaded connection so that its position can be readily changed.

Additional objects, advantages and features of the present invention will become apparent from the following description and appended claims, taken in conjunction with the accompanying drawings.

BRIEF DESCRIPTION OF THE DRAWINGS

FIG. 1 is a side view of a proportional variable bleed solenoid valve according to an embodiment of the present invention;

FIG. 2 is a top view of the solenoid valve shown in FIG. 1;

FIG. 4 is a cut-away cross-sectional view showing a valve sleeve threadably engaged with a mounting bracket, according to another embodiment of the present invention.

DETAILED DESCRIPTION OF THE PREFERRED EMBODIMENTS

Figure 3:
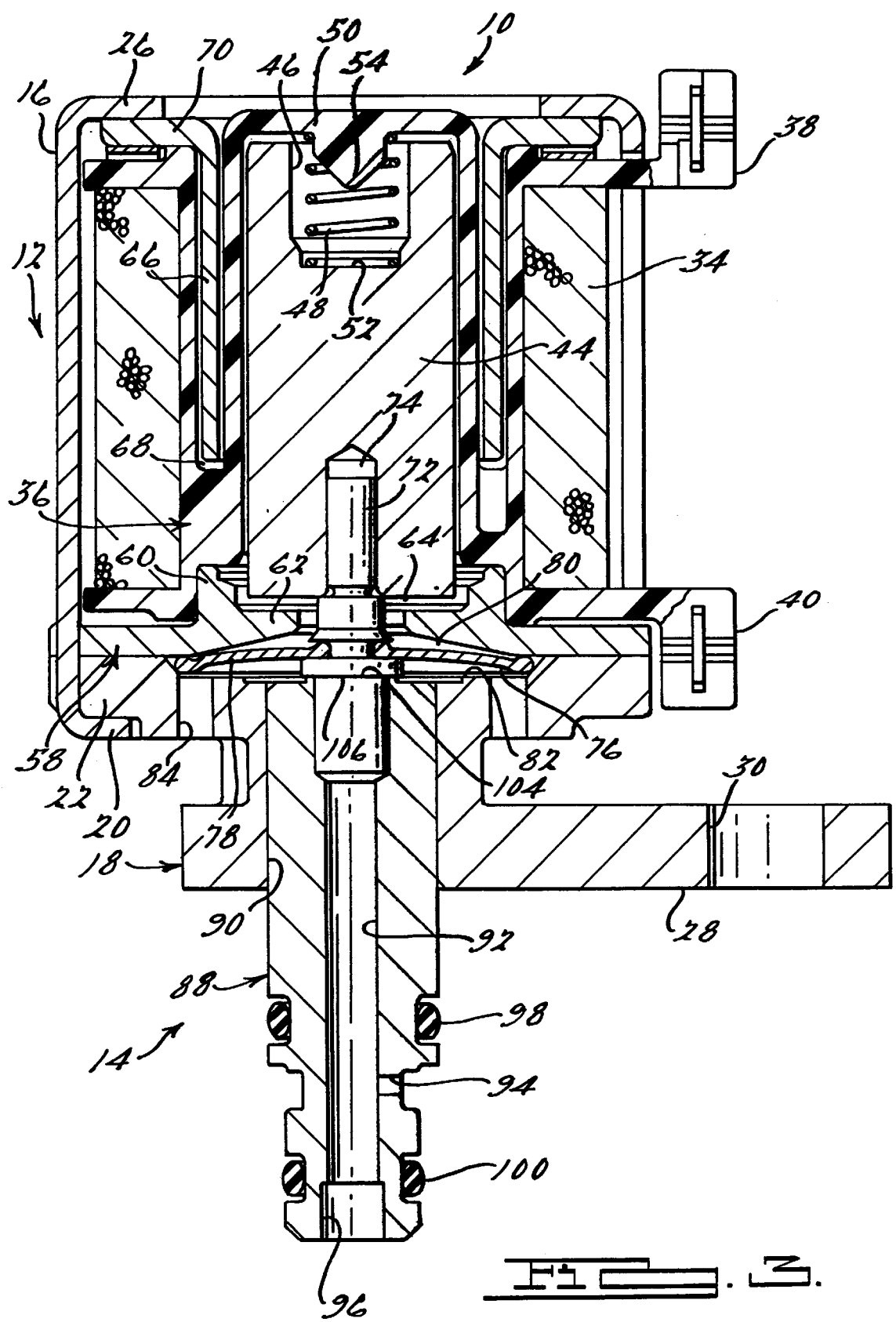
FIG. 3 is a cross-sectional view of the solenoid valve shown in FIG. 1.

The following discussion of the preferred embodiments directed to a proportional variable bleed solenoid valve including a technique for providing a magnetic force adjustment for magnetic calibration is merely exemplary in nature, and is in no way intended to limit the invention or its applications or uses.

FIG. 1 shows a side view, FIG. 2 shows a top view and FIG. 3 shows a cross-sectional view of a proportional variable bleed solenoid valve 10, including an upper magnetic portion 12 and a lower hydraulic portion 14, according to an embodiment of the present invention. In one embodiment, the variable bleed solenoid valve 10 is a signal level device used to switch (reciprocate) a spool valve (not shown) to control (engage) the clutch of an automatic transmission for a vehicle. Because the solenoid valve 10 is a low flow device, a larger flow spool valve is generally required to provide the operating pressure for actuating the clutch. The use of a proportional bleed solenoid valve as a signal level device to control the actuation of the clutch in an automatic transmission is known in the art. Therefore, the specific hydraulic connections, source pressures and control pressures used in association with the solenoid valve 10 will not be shown or described below, as these things form no part of the present invention, and are well known to those skilled in the art. The internal components of the solenoid valve 10 make up the invention, and will be discussed in detail below. Also, as will be appreciated by those skilled in the art, the solenoid valve 10 of the invention is not limited for use in an automatic transmission of a vehicle, but has a much broader use in any control device that may use a solenoid valve of the type described herein. The upper magnetic portion 12 includes an outer housing or can 16 that encloses the magnetic components of the solenoid 10. The can 16 is made of a suitable magnetic material, such as a low carbon steel. The can 16 is attached to a mounting bracket 18 by crimping a series of lower flanges 20 to a ridge portion 22 of the bracket 18 along a lower portion of the can 16. In this example, there are three flanges 20. However, the can 16 can be secured to the bracket 18 by any suitable fastening device. An upper flange 26 of the can 16 is bent over to form a crimp connection at the top of the solenoid 10. The mounting bracket 18 includes an extended mounting arm 28 including an opening 30. A suitable bolt (not shown) is inserted into the opening 30 and bolted, for example, to a main module casting (not shown) to secure the solenoid valve 10 within the transmission. In one embodiment, the main module casting includes other solenoid valves, stepper motors, hydraulic components, etc. used in the control of an automatic vehicle transmission, as would be well understood to those skilled in the art.

The magnetic portion 12 further includes a coil 34 wound on a bobbin 36 and coaxially positioned within the can 16 as shown. The bobbin 36 is a molded plastic member that is formed to have the configuration, as shown. The bobbin 36 includes a first terminal contact 38 and a second terminal contact 40 that extend out of the can 16. In one embodiment, the terminal contacts 38 and 40 are insulation displacement-type terminal contacts. Wires from the coil 34 are connected to the terminal contacts 38 and 40 so that an electrical circuit connected to the terminal contacts 38 and 40 will energize the coil 34.

A cylindrically shaped armature 44 is coaxially positioned at the center of the can 16, and is nearly completely surrounded by the bobbin 36, as shown, such that it contacts the bobbin 36. In this configuration, an inside surface of the bobbin 36 acts as a bearing surface when the armature 44 moves up and down within the can 16. In one embodiment, the armature 44 is made of a magnetic powdered metal to receive the magnetic flux lines created by the coil 34 when it is energized. However, the armature 44 can be made of any suitable material that is magnetic. The armature 44 includes an upper opening 46 in which is positioned a low force spring 48. The low force spring 46 is positioned in the opening 46 between an upper wall 50 of the bobbin 36 and an internal surface 52 of the opening 46, and is centered by a centering portion 54 of the bobbin 36, to apply a low bias force on the armature 44 in a direction towards the hydraulic portion 14. The spring 48 gives the armature 44 an initial or home position.

A pole piece 58 is magnetically attached to the can 16 by a crimp connection, or the like, and is positioned adjacent a lower portion of the armature 44, as shown. The pole piece 58 has an annular configuration, and includes an upper annular portion 60 contacting the bobbin 36 and positioned around a side of the lower portion of the cylindrical shaped armature 44. The annular portion 60 provides flux shunting of the magnetic field lines. The pole piece 58 also includes an annular, extended portion 62 positioned below a bottom surface of the armature 44, and defining an air gap 64 therebetween. In one embodiment, the pole piece 58 is made of a magnetic steel, and may be made of the same material as the can 16. A cylindrical flux tube 66 extends down into an opening 68 in the bobbin 36, as shown, and is positioned between the armature 44 and the coil 34. The flux tube 66 includes an upper flange 70, and is connected to the upper flange 26 of the can 16 by a crimp connection, or the like. In one embodiment, the flux tube 66 is also made of a low carbon magnetic steel, and is formed by a deep drawn process to reduce costs.

When the coil 34 is energized, the magnetic flux lines enter the can 16 and travel into the pole piece 58. The magnetic flux lines then travel across the gap 64 and enter the armature 44. Magnetic flux lines that go through the upper portion 60 of the pole piece 58 travel up the sides of the armature 44 and cross the bobbin 36 to enter the flux tube 66. Magnetic flux lines that pass through the portion 62 enter the armature 44 and return to the can 16 through the flux tube 66. The magnetic flux lines across the gap 64 cause the armature 44 to be attracted to the pole piece 58, thus causing the armature 44 to move downwards.

The armature 44 includes an opening 74 formed through a bottom surface of the armature 44. A poppet valve 72, made of a non-magnetic material such as a stainless steel, is press fit into the opening 70, and extends down from the armature 44 through the gap 64 and the annular opening defined by the extended portion 62, as shown. A bottom portion of the poppet valve 72 extends into an exhaust cavity 76 defined by the pole piece 58 and the ridge portion 22. The exhaust cavity 76 is separated by a diaphragm 78 into an upper exhaust cavity 80 and a lower exhaust cavity 82. The diaphragm 78 is made of a suitable flexible material, such as silicon, that stands up to the rigors of the hydraulic environment, and does not deteriorate from hydraulic fluid. The diaphragm 78 also acts as a contamination barrier against magnetic particles. The diaphragm 78 is sealed to the poppet valve 72 and the mounting bracket 18, as shown. An exhaust port 84 is in fluid communication with the lower exhaust cavity 82. The exhaust port 84 is connected to a transmission fluid reservoir or a drainage system, and provides a low pressure output for the valve 10.

The hydraulic portion 14 of the solenoid 10 includes a cylindrical valve sleeve 88 that is secured within an internal bore 90 of the bracket 18. The valve sleeve 88 defines an axial bore chamber 92 coaxially configured relative to the armature 44. A supply pressure ($P_s$) orifice 94 in fluid communication with the chamber 92 is provided through an outside wall of the valve sleeve 88 and a control pressure ($P_c$) opening 96 in fluid communication with the chamber 92 is provided at the bottom of the sleeve 88. A bottom portion of the valve sleeve 88 is inserted into a stepped bore (not shown) in the main module casting until the mounting arm 28 contacts the casting, and is sealed therein by a pair of O-rings 98 and 100.

A top seat surface 104 of the valve sleeve 88 seats against a bottom seal surface 106 of the poppet valve 72 to seal the upper end of the chamber 92. FIG. 3 shows the armature 44 in the energized state such that the seal surface 106 contacts the seat surface 104 and closes off the chamber 92. Transmission fluid is applied to the supply orifice 94 at the supply pressure $P_s$ from a regulator valve fed by a pump (not shown) so that transmission fluid enters the chamber 92. When the coil 34 is not energized, the transmission fluid pressure is applied against the seal surface 106 of the valve 72, and forces the armature 44 upwards away from the sleeve 88 against the bias of the spring 48. In this situation, the transmission fluid running through the chamber 92 is free to vent from the lower exhaust cavity 82 through the low pressure exhaust port 84. The diaphragm 78 prevents the transmission fluid from entering the upper chamber 80, and prevents the transmission fluid from contaminating the magnetic portion 12. In this condition, the fluid pressure at the control opening 96 is low.

When the coil 34 is energized, the magnetic field across the gap 64 causes the magnetic armature 44 to be attracted towards the magnetic pole piece 58. As the armature 44 approaches the extended portion 62, the magnetic flux lines are formed more radially relative to the armature 44 by a vertical inside surface of the annular portion 60 to linearize the magnetic force gain. The closer the armature 44 is to the pole piece 58, the greater the magnetic attraction is between the armature 44 and the pole piece 58, providing increased sealing pressure. The seal surface 106 will contact the seat surface 104 before the armature 44 contacts the extended portion 62. Once the poppet valve 72 contacts the sleeve 88, the seal surface 106 seats against the seat surface 104 to prevent transmission fluid from entering the lower exhaust cavity 82. When the poppet valve 72 seats against the sleeve 88, the supply pressure $P_s$ is applied to the control port 96 and the control pressure $P_c$ is nearly the same as the supply pressure $P_s$. Depending on the supply pressure $P_s$ and the current in the coil 34, there may be some leakage into the exhaust cavity 82. The greater the current applied to the coil 34, the more force is available to seal the poppet valve 72 against the sleeve 88, and thus the greater the supply pressure $P_s$ can be. The solenoid valve 10 is referred to as being proportional, because an increase in current on the coil 34 allows an increase of control pressure $P_c$.

The acceptable recognized dimensional tolerances in the industry for the various components of the solenoid valve 10, such as the sleeve 88, the bracket 18, the armature 44, the poppet valve 72, etc., provides significant variances in the amount of current applied to the coil 34 required to seal the chamber 92 for different source pressures. In other words, the travel of the armature 44 necessary to seal the seal surface 106 to the seat surface 104 may be different from solenoid valve to solenoid valve. The closer the armature 44 is to the pole piece 58, i.e., the smaller the gap 64, the greater the sealing force between the poppet valve 72 and the valve sleeve 88. This becomes a problem because it is necessary that the solenoid valves respond substantially the same from vehicle to vehicle at the same currents and pressures. Therefore, prior to the solenoid valve 10 being mounted to the vehicle transmission, a calibration test can be performed on the solenoid 10 to insure that the appropriate magnetic calibration is present.

In accordance with the teachings of the present invention, a magnetic force calibration adjustment is provided for the valve 10 by selectively positioning the sleeve 88 within the opening 90 in the bracket 18 so that the position of the sleeve 88 corresponds to the desired seating of the poppet valve 72 to consistently provide the control pressure $P_c$ at a particular current applied to the coil 34. FIG. 3 shows the valve sleeve 88 secured to the bracket 18 by a press fit type connection where the sleeve 88 is selectively held in place at a desired location by a frictional engagement. However, any suitable technique for positioning the sleeve 88 in the bracket 18 can be used in accordance with the teachings of the present invention. For example, the sleeve 88 can be welded to the bracket 18, glued to the bracket 18, etc.

FIG. 4 shows the area of the valve 10 where the sleeve 88 is connected to the bracket 18 to show an alternate embodiment. In this embodiment, the sleeve 88 includes outer diameter threads 108 and the bracket 18 includes inner diameter threads 110 in the opening 90 such that the sleeve 88 can be positioned relative to the bracket 18 at a desirable location. One skilled in the art would readily recognize the type of testing and equipment needed to position the sleeve 88 in the desirable location for this type of calibration. Such a test may include providing a constant supply pressure $P_s$ and a constant core current, and then adjusting the position of the sleeve 88 until the desired control pressure $P_c$ is achieved.

The foregoing discussion discloses and describes merely exemplary embodiments of the present invention. One skilled in the art will readily recognize from such discussion, and from the accompanying drawings and claims, that various changes, modifications and variations can be made therein without departing from the spirit and scope of the invention as defined in the following claims.

What is claimed is:

1. A fluid control valve comprising:

a housing defining a chamber therein;

an electromagnetic coil wound on a bobbin and coaxially mounted within the chamber;

a movable armature positioned within the chamber and having a first end and a second end, said second end including an extended armature poppet valve, said armature poppet valve including a seal surface;

an armature spring in contact with the first end of the armature and the bobbin, wherein the armature is positioned in a first position when the coil is de-energized and wherein the armature moves to a second position in conjunction with the bias of the armature spring when the coil is energized;

a pole piece mounted to the housing and positioned adjacent to the second end of the armature and defining an air gap therebetween, said pole piece including an extended ring positioned below the second end of the armature such that the armature poppet valve extends through the ring;

a mounting bracket secured to the housing adjacent to the pole piece; and a valve sleeve connected to the mounting bracket and including a central bore axially aligned with the armature, said valve sleeve including a valve seat surface adjacent to the seal surface of the armature poppet valve such that when the armature is in the second position, the seal surface seats against the seat surface, said valve sleeve including a supply pressure orifice and a control pressure opening, wherein the valve sleeve is adjustable relative to the mounting bracket so as to adjust the distance between the seal surface and the seat surface so as to provide a magnetic force adjustment.

2. The control valve according to claim 1 wherein the valve sleeve is adjustable relative to the mounting bracket by a threaded connection.

3. The control valve according to claim 2 wherein an outer diameter portion of the valve sleeve has outer threads and an inner diameter bore of the mounting bracket has internal threads to provide the threaded connection between the valve sleeve and the mounting bracket.

4. The control valve according to claim 1 wherein the valve sleeve is adjustable relative to the mounting bracket by a press fit connection.

5. The control valve according to claim 1 wherein the armature is movable between a first position and a second position on a bearing surface defined by the bobbin such that the armature is in contact with the bobbin.

6. The control valve according to claim 1 wherein the bobbin is a molded plastic member.

7. The control valve according to claim 1 further comprising a deep drawn flux tube, said flux tube connected to the bobbin and being positioned between the coil and the armature in a coaxial manner.

8. The control valve according to claim 1 wherein the mounting bracket includes an exhaust opening, wherein the supply pressure applied to the supply orifice is exhausted through the exhaust opening when the armature is in the first position.

9. The control valve according to claim 1 wherein the housing defines an exhaust cavity around the armature poppet valve, and wherein a diaphragm connected to the armature poppet valve separates the exhaust cavity into an upper portion and a lower portion.

10. The control valve according to claim 1 wherein the bobbin includes a first terminal contact and a second terminal contact extending from the housing.

11. The control valve according to claim 1 wherein the mounting bracket includes an extended mounting arm including an opening therethrough to secure the valve to a modular casting.

12. The control valve according to claim 1 wherein the control valve is a proportional variable bleed solenoid valve.

13. A fluid control valve comprising:

a housing defining a chamber therein;

an electromagnetic coil wound on a bobbin and coaxially mounted within the chamber;

a movable armature positioned within the chamber, said armature including an extended armature poppet valve having a seal surface;

a pole piece connected to the housing and positioned adjacent to the armature and defining an air gap therebetween;

a mounting bracket secured to the housing adjacent to the armature poppet valve; and a valve sleeve connected to the mounting bracket and including a central bore axially aligned with the armature, said valve sleeve including a valve seat surface adjacent to the seal surface of the armature poppet valve, said armature being movable when the coil is energized to force the seal surface to contact the seat surface in a sealing engagement, wherein the valve sleeve includes means for adjusting the position of the valve sleeve relative to the mounting bracket so as to adjust the distance between the seal surface and the seat surface so as to provide a magnetic force adjustment.

14. The control valve according to claim 13 wherein the means for adjusting the valve sleeve is a threaded connection.

15. The control valve according to claim 14 wherein an outer diameter portion of the valve sleeve has outer threads and an inner diameter bore of the mounting bracket has internal threads to provide the threaded connection between the valve sleeve and the mounting bracket.

16. The control valve according to claim 13 wherein the means for adjusting the valve sleeve is a press fit connection.

17. The control valve according to claim 13 further comprising a deep drawn flux tube, said flux tube connected to the bobbin and positioned between the coil and the armature in a coaxial manner.

18. The control valve according to claim 13 wherein the pole piece includes an extended ring positioned below an end of the armature such that the armature poppet valve extends through the ring.

19. The control valve according to claim 13 wherein the armature is movable between a first position and a second position on a bearing surface defined by the bobbin such that the armature is in contact with the bobbin.

20. A proportional variable bleed solenoid valve comprising:

a housing defining a chamber therein;

an electromagnetic coil wound on a bobbin and coaxially mounted within the chamber, said bobbin being a molded plastic member;

a movable armature positioned within the chamber and having a first end and a second end, said second end including an extended armature poppet valve, said armature poppet valve including a seal surface, said armature being movable within the chamber such that the armature rides on a bearing surface of the bobbin;

an armature spring in contact with the first end of the armature and the bobbin, wherein the armature is positioned in a first position when the coil is de-energized and wherein the armature moves to a second position in conjunction with the bias of the armature spring when the coil is energized;

a pole piece mounted to the housing and positioned adjacent to the second end of the armature and defining an air gap therebetween, said pole piece including an extended ring positioned below the second end of the armature such that the armature poppet valve extends through the ring;

a flux tube connected to the bobbin and being positioned between the coil and the armature in a coaxial manner;

a mounting bracket secured to the housing adjacent to the pole piece, wherein the pole piece and the mounting bracket define an exhaust cavity in fluid communication with an exhaust port extending through the mounting bracket; and a valve sleeve connected to the mounting bracket and including a central bore axially aligned with the armature, said valve sleeve including a valve seat surface forming part of the exhaust cavity and being adjacent to the seal surface of the armature poppet valve such that when the armature is in the second position, the seal surface seats against the seat surface, said valve sleeve including a supply pressure orifice and a control pressure opening in fluid communication with the central bore, wherein the valve sleeve includes an external thread and the mounting bracket includes an internal thread such that the valve sleeve is selectively positionable relative to the mounting bracket by threading the valve sleeve to the mounting bracket so as to adjust the distance between the seal surface and the seat surface to provide a magnetic force adjustment.

* * * * *